(12) United States Patent
Bianco et al.

(10) Patent No.: US 8,930,575 B1
(45) Date of Patent: Jan. 6, 2015

(54) SERVICE FOR AUTOMATICALLY CONVERTING CONTENT SUBMISSIONS TO SUBMISSION FORMATS USED BY CONTENT MARKETPLACES

(75) Inventors: Antonio Bianco, Laguna Niguel, CA (US); Danny S. Hyun, Irvine, CA (US); Jordan P. Marinov, Corona, CA (US)

(73) Assignee: Amazon Technologies, Inc., Seattle, WA (US)

( * ) Notice: Subject to any disclaimer, the term of this patent is extended or adjusted under 35 U.S.C. 154(b) by 651 days.

(21) Appl. No.: 13/076,341

(22) Filed: Mar. 30, 2011

(51) Int. Cl.
 G06F 15/16 (2006.01)
 G06Q 30/00 (2012.01)
 G06Q 30/06 (2012.01)
 H04L 29/06 (2006.01)
 G06F 17/30 (2006.01)
 H04N 21/235 (2011.01)
 H04L 12/28 (2006.01)

(52) U.S. Cl.
 CPC ...... G06Q 30/0621 (2013.01); H04L 29/06482 (2013.01); G06F 17/30194 (2013.01); G06F 17/30017 (2013.01); H04N 21/2353 (2013.01); H04L 12/2836 (2013.01)
 USPC ........ 709/246; 705/26.41; 705/26.5; 709/203

(58) Field of Classification Search
 CPC .................... G06F 17/30017; G06F 17/30194; G06Q 30/0621; H04L 12/2836; H04L 29/06482; H04N 21/2353
 USPC ....................... 709/246, 203; 705/26.41, 26.5
 See application file for complete search history.

(56) References Cited

U.S. PATENT DOCUMENTS

| | | | | |
|---|---|---|---|---|
| 5,132,992 | A * | 7/1992 | Yurt et al. | 375/240 |
| 5,592,375 | A * | 1/1997 | Salmon et al. | 705/321 |
| 6,714,933 | B2 * | 3/2004 | Musgrove et al. | 707/709 |
| 7,086,032 | B2 * | 8/2006 | Nirell et al. | 717/113 |
| 7,099,873 | B2 * | 8/2006 | Agarwalla et al. | 1/1 |
| 7,117,167 | B2 * | 10/2006 | Seal et al. | 705/50 |
| 7,321,886 | B2 * | 1/2008 | Swaminathan et al. | 706/60 |
| 7,447,649 | B2 * | 11/2008 | Jain et al. | 705/27.2 |
| 7,472,077 | B2 * | 12/2008 | Roseman et al. | 705/26.44 |
| 7,640,186 | B1 | 12/2009 | Fraser et al. | |
| 7,668,755 | B2 * | 2/2010 | Jain et al. | 705/26.9 |
| 7,809,671 | B2 * | 10/2010 | Swaminathan et al. | 706/60 |
| 7,882,179 | B2 * | 2/2011 | Witchel | 709/206 |
| 7,912,892 | B2 * | 3/2011 | Willian et al. | 709/200 |
| 7,962,947 | B2 * | 6/2011 | Kulakowski | 725/110 |
| 7,970,263 | B1 * | 6/2011 | Asch | 386/350 |
| 8,015,237 | B2 * | 9/2011 | Muller et al. | 709/201 |
| 8,069,134 | B2 * | 11/2011 | Swaminathan et al. | 706/60 |
| 8,099,455 | B2 * | 1/2012 | Aronsson et al. | 709/203 |
| 8,166,123 | B2 * | 4/2012 | Witchel | 709/206 |
| 8,224,767 | B2 * | 7/2012 | Swaminathan et al. | 706/60 |

(Continued)

*Primary Examiner* — Daniel C Murray
(74) *Attorney, Agent, or Firm* — Knobbe, Martens, Olson & Bear, LLP

(57) ABSTRACT

A content submission system may provide a submission format to a content creator that allows content, including but not limited to software applications, to be submitted in a content submission bundle. The content submission system may examine the received content submission bundle, and determine one or more submission formats for submitting the content to one or more electronic content marketplaces. In some embodiments, the content submission system may act as a central broker for content submissions to multiple content marketplaces. For example, the content submission system may translate the content submission bundle into the submission formats used by respective marketplaces so that the content creator/submitter need not perform this task.

20 Claims, 3 Drawing Sheets

(56) References Cited

U.S. PATENT DOCUMENTS

| | | | | |
|---|---|---|---|---|
| 8,239,446 | B2* | 8/2012 | Navar et al. | 709/203 |
| 8,281,350 | B2* | 10/2012 | Ozawa | 725/93 |
| 8,370,419 | B2* | 2/2013 | Muller et al. | 709/201 |
| 8,375,416 | B2* | 2/2013 | Smith et al. | 725/137 |
| 8,438,603 | B2* | 5/2013 | Hardin et al. | 725/93 |
| 8,478,767 | B2* | 7/2013 | Kern et al. | 707/756 |
| 8,538,992 | B1* | 9/2013 | Lawyer et al. | 707/790 |
| 8,566,137 | B1* | 10/2013 | Cabrera et al. | 705/7.22 |
| 8,589,423 | B2* | 11/2013 | Kern et al. | 707/756 |
| 8,682,809 | B2* | 3/2014 | Avedissian et al. | 705/347 |
| 8,700,700 | B2* | 4/2014 | Shinomoto et al. | 709/203 |
| 8,832,175 | B2* | 9/2014 | du Preez et al. | 709/201 |
| 2002/0073177 | A1* | 6/2002 | Clark et al. | 709/219 |
| 2002/0091584 | A1* | 7/2002 | Clark et al. | 705/26 |
| 2002/0188481 | A1* | 12/2002 | Berg et al. | 705/4 |
| 2003/0065895 | A1* | 4/2003 | Heng et al. | 711/154 |
| 2003/0200156 | A1* | 10/2003 | Roseman et al. | 705/27 |
| 2003/0225723 | A1* | 12/2003 | Agarwalla et al. | 707/1 |
| 2004/0039754 | A1* | 2/2004 | Harple, Jr. | 707/104.1 |
| 2004/0148344 | A1* | 7/2004 | Navar et al. | 709/203 |
| 2004/0168149 | A1* | 8/2004 | Nirell et al. | 717/105 |
| 2004/0255335 | A1* | 12/2004 | Fickle et al. | 725/135 |
| 2004/0260764 | A1* | 12/2004 | Witchel | 709/202 |
| 2005/0021859 | A1* | 1/2005 | Willian et al. | 709/246 |
| 2005/0027696 | A1* | 2/2005 | Swaminathan et al. | 707/3 |
| 2005/0071280 | A1 | 3/2005 | Irwin et al. | |
| 2005/0188424 | A1 | 8/2005 | Kizyma | |
| 2005/0278629 | A1* | 12/2005 | Chailleux | 715/704 |
| 2006/0120522 | A1* | 6/2006 | Clark et al. | 380/201 |
| 2006/0159109 | A1* | 7/2006 | Lamkin et al. | 370/401 |
| 2006/0284838 | A1* | 12/2006 | Tsatalos et al. | 345/156 |
| 2007/0033574 | A1* | 2/2007 | Nirell et al. | 717/109 |
| 2007/0162351 | A1* | 7/2007 | Jain et al. | 705/26 |
| 2007/0162352 | A1* | 7/2007 | Jain et al. | 705/26 |
| 2007/0162391 | A1* | 7/2007 | Jain et al. | 705/50 |
| 2007/0234291 | A1* | 10/2007 | Ronen et al. | 717/120 |
| 2007/0250598 | A1* | 10/2007 | Jain et al. | 709/218 |
| 2007/0266028 | A1* | 11/2007 | Muller et al. | 707/8 |
| 2007/0266324 | A1* | 11/2007 | Chailleux | 715/730 |
| 2008/0101768 | A1* | 5/2008 | Smith et al. | 386/108 |
| 2008/0215683 | A1* | 9/2008 | Swaminathan et al. | 709/205 |
| 2008/0294531 | A1 | 11/2008 | Nassimi | |
| 2009/0055288 | A1 | 2/2009 | Nassimi | |
| 2009/0100465 | A1* | 4/2009 | Kulakowski | 725/39 |
| 2009/0106847 | A1 | 4/2009 | Krupman et al. | |
| 2010/0058419 | A1* | 3/2010 | Ozawa | 725/114 |
| 2010/0161499 | A1 | 6/2010 | Holcombe et al. | |
| 2011/0022436 | A1* | 1/2011 | Swaminathan et al. | 705/7 |
| 2011/0196936 | A1* | 8/2011 | Witchel | 709/206 |
| 2011/0296536 | A1* | 12/2011 | Muller et al. | 726/30 |
| 2012/0010995 | A1* | 1/2012 | Skirpa et al. | 705/14.49 |
| 2012/0047106 | A1* | 2/2012 | Swaminathan et al. | 706/60 |
| 2012/0084354 | A1* | 4/2012 | Shinomoto et al. | 709/203 |
| 2012/0185066 | A1* | 7/2012 | Kern et al. | 700/91 |
| 2012/0269394 | A1* | 10/2012 | Kern et al. | 382/103 |
| 2012/0272139 | A1* | 10/2012 | Kern et al. | 715/234 |
| 2013/0208182 | A1* | 8/2013 | Smith et al. | 348/441 |
| 2013/0219458 | A1* | 8/2013 | Ramanathan | 726/1 |
| 2013/0283301 | A1* | 10/2013 | Avedissian et al. | 725/5 |
| 2013/0304604 | A1* | 11/2013 | Hoffman et al. | 705/26.5 |
| 2014/0101565 | A1* | 4/2014 | Mahieu et al. | 715/748 |
| 2014/0115454 | A1* | 4/2014 | Li | 715/273 |
| 2014/0150029 | A1* | 5/2014 | Avedissian et al. | 725/60 |
| 2014/0164283 | A1* | 6/2014 | Avedissian et al. | 705/347 |
| 2014/0165086 | A1* | 6/2014 | Avedissian et al. | 725/14 |
| 2014/0176536 | A1* | 6/2014 | Kern et al. | 345/419 |
| 2014/0218385 | A1* | 8/2014 | Carmi | 345/590 |

* cited by examiner

SERVICE FOR AUTOMATICALLY CONVERTING CONTENT SUBMISSIONS TO SUBMISSION FORMATS USED BY CONTENT MARKETPLACES

BACKGROUND

The growth of the Internet has made digital distribution of content more desirable. The lower costs of digital distribution over a computer network versus distribution using physical media can only be expected to further drive the growth of the digital distribution channel. A growing number of content types such as applications, games, music, books and movies are now available through digital downloads, either as an alternative to physical media or as the exclusive distribution channel for the content.

With the growth of digital distribution of content, content marketplaces have appeared that aggregate and provide content from multiple publishers. Content marketplaces allow users to have a "one stop shop" for a variety of types of content. However, as there are many content marketplaces, managing content submissions to multiple content marketplaces can be a difficult and complicated process for content developers.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
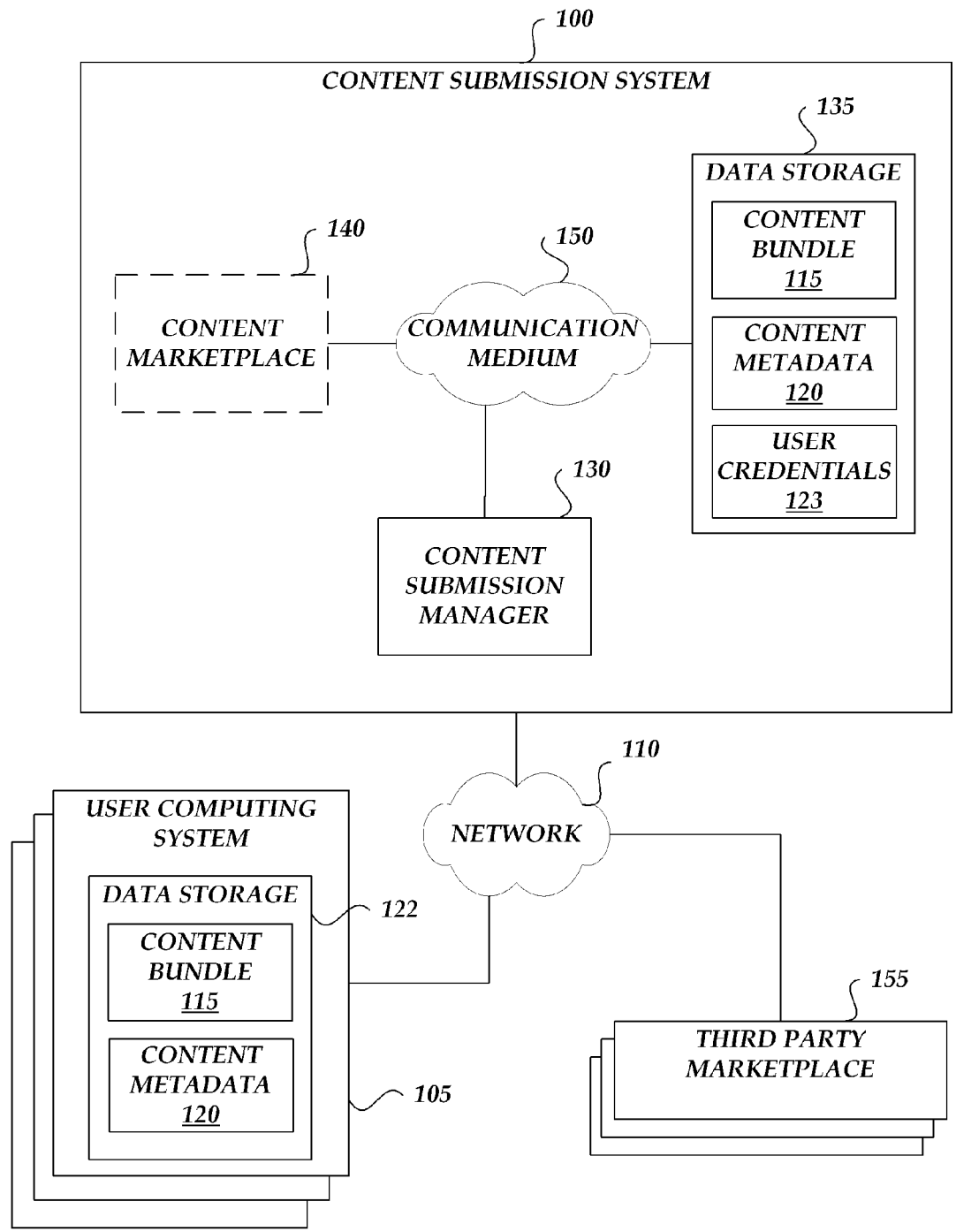
FIG. 1 is a network diagram schematically illustrating an example of a content submission system that manages content submission.

Typically, different marketplaces have different submission formats for content. Thus, a content developer may need to create different content submissions to submit the same content item to different respective marketplaces. For example, an application developer wishing to distribute a mobile application via multiple Internet-based application stores typically must create a separate submission package (each having a different format) for each application store. This process can become burdensome and time consuming.

In addition, many content developers submit content using web interfaces provided by the content marketplaces. The web interfaces may require content to be submitted using multiple pages, in a particular order and/or with additional content descriptions. The use of the web interfaces can further complicate the content submission process.

One embodiment of the invention is a content submission system that addresses at least some of these problems. The content submission system may provide a submission format to a content creator that allows content, including but not limited to software applications, to be submitted in a content submission bundle. The content submission system may examine the received content submission bundle, and determine one or more submission formats for submitting the content to one or more electronic content marketplaces. In some embodiments, the content submission system may act as a central broker for content submissions to multiple content marketplaces. For example, the content submission system may translate the content submission bundle into the submission formats used by respective marketplaces so that the content creator/submitter need not perform this task.

By providing management of the content submission process, the content submission system can simplify the submission process for content developers or other content creators. Other potential benefits may include consistency in published content items, time savings for content submissions, faster updating of content items to a new version, and/or better quality submissions. For example, the content submission system can track and propagate new versions of content items to other marketplaces so that the content creator/submitter need not perform this task. By managing content submissions to other marketplaces, the content management system may help keep content items consistent and up to date, even if located in different content marketplaces operated by different entities. In another example, the content submission system can validate or otherwise test the content submission and/or can add enhanced content to the content submission, thereby improving the quality of the submission.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential. The scope of protection is defined by the claims.

FIG. 1 is a network diagram schematically illustrating an example of a content submission system 100 that manages content submissions. Users (e.g., content developers or publishers) associated with user computing systems 105 are in communication with the content submission system 100 via a communication network 110. Users can submit content to the content submission system to have that content submitted to content marketplaces 140, 155 and made available for purchase and/or download by marketplace customers for their customer devices, such as tablets, smart phones, e-readers, non-mobile computers, and other types of computing devices. Some examples of the types of digital content that may be managed by the content submission system 100 include mobile device applications, games, other types of software applications, music, e-books, and videos.

The content submission system 100 may be in communication with multiple content marketplaces 140, 155 and may be associated with a particular content marketplace 140. Among other functions, content marketplaces 140, 155 store content items/products (e.g., applications, e-books, etc.) submitted by publishers, authors, and/or developers, and make these items available to customers. The content marketplace 140 preferably hosts an electronic catalog that provides functionality for customers to locate, download, and, where applicable, pay for content items of interest. The electronic catalog may be accessible via a web site, an "app store" application that runs on mobile devices of users, and/or other types of interactive systems. Typically, the electronic catalog includes a separate detail page for each content item. The detail page for a given content item may, for example, include a description provided by the item's creator, price information, information about the item's creator, customer reviews, device compatibility information, screen shots (where applicable), and other types of information that may be useful to customers.

In some embodiments, the content submission system 100 maintains accounts for its users (e.g., developers or other content creators). The accounts may be associated with information about the users' content submissions, such as content files, the price of the content, description of the content, current version of the content or other account information. This data can be updated based at least partly on content submissions sent by the users. For example, if a user wants to publish a new version of an application, the user can submit a content submission having new content files. The content submission system can then update the content files for that application and update the information associated with that content. In some embodiments (e.g., where the content submission system 100 is associated with a content marketplace 140), the content submission system 100 may maintain or have access to accounts of content marketplace 140 customers who purchase content from the content marketplace 140. Typically, these customer accounts are different from the user accounts associated with content creators.

Typically, the user computing system 105 stores the content data associated with particular content items. The content data may include images, binaries, videos, and/or other electronic data, and may be grouped as a content bundle 115. Typically, the content data are stored and/or transmitted as electronic files, though the content data may also be transmitted as one or more data streams. The content bundle may comprise a single content file or stream, a compressed file (e.g., ZIP, RAR, or other compressed file format) or multiple files. In one embodiment, the content files may be stored in a common directory. The content or content files may be described by the content metadata 120. In some embodiments, the content metadata 120 comprises content file titles, descriptions, key words, content price, versioning information and/or the like. The content metadata may, for example, be contained in an extensible markup language (XML) file. Other file formats, such as flat text files, S-expressions, JavaScript Object Notation (JSON), and/or text streams can also be used. In some embodiments, the content metadata file may be part of the content bundle 115. The content bundle 115 and content metadata 120 may be stored in data storage 122 of the user computing system 105 or may be stored elsewhere, for example, on a file storage service, web site, or computing system different from the user computing system 105.

In FIG. 1, users may use the user computing systems 105 to access the content submission system 100 over the communication network 110. The network 110 may, for example, be a publicly accessible network of linked networks, possibly operated by various distinct parties, such as the Internet. In other embodiments, the network 110 may be a private network, such as, for example, a corporate or university network that is wholly or partially inaccessible to non-privileged users. In still other embodiments, the network 110 may include one or more private networks with access to and/or from the Internet.

The content submission system 100 provides a variety of functionality for managing content submissions from multiple users. In some embodiments, the content submission system comprises one or more computing systems having one or more computing devices. In FIG. 1, the content submission system comprises a content submission manager 130, data storage 135 and, optionally, a content marketplace 140 in communication via a communication medium 150. In some embodiments, the communication medium 150 comprises a network, which may include multiple networking devices (not shown) such as, e.g., switches, edge routers, core routers, etc. The network may, but need not, be a different network than the network 110 shown in FIG. 1. In some embodiments, the communication medium comprises a computer bus, for example, where two or more components are located on the same computing device. In some embodiments, the content marketplace 140 may be operating on a separate computing system from the content submission system 100. The separate computing system may be in communication with the content submission manager 130 via the network 110. For example, the content submissions system 100 may be a broker service that acts as an intermediary between developers and various marketplaces are unaffiliated with the broker service.

Users (e.g., content creators) of the content submission system 100 can interact with the content submission system (e.g., via a content submission manager 130) to submit content. The content submission manager 130 can receive content submissions from the user computing systems 105 over the network 110. A user may request that the content submission manager 130 submit a content item to the content marketplace 140 or other third-party marketplaces 155. Typically, the content marketplace 140 and the third-party marketplaces are operated by different business entities, though a single business entity may operate more than one content marketplace. For example, the third-party marketplaces may operate on computing systems comprising one or more computing devices, the computing systems operated by different business entities, the computing systems in communication with the content submission system 100 via the network 110.

In FIG. 1, the user computing system 105 can send a content submission bundle to the content submission system. In some embodiments, the content submission bundle includes a copy of the content bundle 115 and the content metadata 120. The content submission may include pointers, links, addresses or locations to one or more electronic files, rather than the actual files. For example, the content submission may include an address of a location of a network server (e.g., HTTP, FTP, SSH FTP or the like) or the data storage 122 from which the content submission manager 130 may obtain the content bundle 115 and/or content metadata. Generally, the location is a secure location that requires access credentials in order to obtain the content stored at the location. The network server may be located at an external network location (e.g., on an external public network). In some embodiments, the content submission manager 130 occasionally or periodically (e.g., daily, weekly or monthly) checks the content location in order to determine if the content needs to be submitted to the marketplace 100. For example, if the content submission manager 130 finds that a new version of the content at the location, the content submission manager 130 can download the content, wholly or partially (e.g., only download updated files), and submit the content to the content marketplace 140 or other marketplaces in order to update the published version to the new version of the content. The content submission manager 130 may determine that that there is new content based at least partly on changes in the files found in the location such as the file names, the addition or removal of files, a change log at the location, or other indication provided by the user.

In some embodiments, the content submission may include access credentials (e.g., keys, tokens, usernames, account names, passwords, etc) for accessing the content bundle 115 or content metadata 120, and/or may include access credentials for submitting the content to a marketplace. The access credentials may be stored or already stored in an account of the content submission system associated with the user. In some embodiments, the content submission is digitally signed with a public key certificate or other electronic certificate in order to verify that the content submission comes from a particular user.

After the content submission manager 130 receives the content submission from the user and obtains the content bundle 115 and content metadata 120, the content submission manager 130 can process the content submission. The content submission manager 130 can store the content bundle 115 and content metadata 120 on data storage 135 (e.g., database, file server, hard drive, optical drive, etc.) of the content submission system. The data storage 135 may also store user credentials 123, such as access credentials for accessing one or more content marketplaces 140, 155. In some embodiments, the content submission manager 130 validates the files by performing security testing. For example, the content submission manager 130 may check access credentials received with the content submission to determine whether the user submitting the content has access rights to an account maintained by the content submission system. If access rights are verified, the content submission manager 130 can then update files and other data associated with the account. The content submission manager 130 may also check a digital signature on the files to verify that the content submission came from the user associated with the account. In some embodiments, the content submission manager 130 performs virus checks or other quality assurance processes on the content submission.

One benefit that may be provided by the content submission manager 130 is abstracting out the submission format used by the content marketplace 140 or by third party marketplaces 155. Thus, the content submission system 100 can translates the content submission bundle into other formats used by other marketplaces so that the content creator/submitter need not perform this task. The content submission bundle may be translated by generating a new, format-compliant content submission bundle or by modifying the content submission to comply with the new submission format used by the content marketplace 140 or third party marketplaces 155. The following disclosure below describes an exemplary scenario where the content submission manager 130 manages submissions of content, including optionally providing the content to third party marketplaces.

The content submission manager 130 can determine the submission format used by the content marketplace 140. The content marketplace 140 may require that files be submitted in a particular submission format. For example, the content marketplace 140 may expect to receive particular file types, may expect files to be in a particular order, may expect descriptions or other metadata about the files, or may expect to receive particular files in response to particular prompts or at particular times (e.g., a first file is expected to be uploaded at a first screen, a second file at a second screen, etc.). As will be apparent, many different types of submission formats could be used by the content marketplace 140.

In one embodiment, the content submission manager 130 accesses format data that describes the submission format. The format data may have been collected by a technician or other person who analyzed the submission format of the content marketplace or the format data may have been provided by the content marketplace. In one embodiment, the content submission manager 130 programmatically communicates with the content marketplace to determine the submission format, such as by communicating through an Application Programming Interface (API). In one embodiment, the API specifies the submission format, for example, by providing an interface for submitting content.

The content submission manager 130 can analyze the content submission to determine the contents of the content bundle 115 and content metadata 120. In one embodiment, the content marketplaces or the content submission system 100 may publish or provide a file naming convention or other content submission standard. For example, the naming convention may identify the file type, the purpose of the file, whether the file is part of the purchasable or downloadable content, whether the file is descriptive of the content (e.g., advertisement or screenshots) or the like. Thus, in one embodiment, the content submission manager 130 examines the file names to obtain submission data describing the content submission, such as the purpose of particular files or which files comprise the content and which files are non-essential files (e.g., readmes, manuals for an application, cover art, reviews, screen shots, etc.).

In addition or as an alternative to examining content files, the content submission manager 130 may use the content metadata 120 to obtain the necessary or requested information regarding these files. The content metadata 120 can include information, such as descriptions, price, etc., that may be needed or requested by the content marketplace. Thus, in some embodiments, the content submission manager 130 can examine the content metadata to obtain submission data describing the content submission.

The content submission manager 130 can use the submission data about the content submission (e.g., from the content metadata or file naming convention) and/or the submission format from the content marketplace 140 to determine which content files are needed or requested by the content marketplace 140. For example, if a particular prompt (e.g., web page, input screen, upload field or the like) of the content marketplace requests a particular file or type of file, the content submission manager 130 can use the submission data about the content submission to identify the corresponding file that would be responsive to the particular prompt. In another example, if the content marketplace requires files to be named or formatted in a particular way or in a particular order, the content submission manager 130 can use the submission data about the content submission to identify the corresponding files and then rename, reformat, reorder or otherwise manipulate the files as needed or requested by the content marketplace 140. For example, digital image or video content items may be manipulated to change particular aspects such as size, format or encoding. In some embodiments, digital rights management (DRM) encryption may be applied to content items.

The content submission manager 130 may translate the content submissions to comply with the content marketplace's 140 submission format. The content submission manager 130 can then submit the content files and/or content metadata to the content marketplace 140. In some embodiments, the content submission manager 130 may generate enhanced content for the content submission before submitting the content files. For example, in the case of application content, the content submission manager 130 may run the application and take screen shots of the application. The content submission manager 130 can then include those screenshots of the application, and/or other enhanced content, with the content submission. In some embodiments, the enhanced content may be generated by a person (e.g., copywriter, technical writer, advertising person, reviewer, or employee associated with the content submission system) and received by the content submission manager 130. Examples of enhanced content can include: reviews, screenshots, videos, product descriptions or the like. In some embodiments, the content submission manager 130 may e-sign the content files to verify that the files came from the content submission manager 130 or content submission system.

After receiving the content submission, the content marketplace 140 can publish the content item and make it available to customers. Customers may then purchase and/or download the content item.

In some embodiments, the content submission manager 130 may act as a broker or coordinating party for content submissions and also submit the content submission to third-party marketplaces 155. In a similar fashion as described above, the content submission manager 130 can determine a second submission format for the third-party marketplace. Typically, this second submission format is different than the submission format of the content marketplace 140. Based at least partly on the content metadata, the content submission manager 130 can modify the content submission to comply with the second submission format of the third-party marketplace 155. As will be apparent, the content submission manager 130 may submit the content submission to multiple other marketplaces by complying with those other marketplaces' submission format(s), for example, by converting the content submission or generating a new content submission compliant with the submission format used by a target marketplace.

By acting as a central broker, the content submission manager 130 can potentially simplify the submission process for content developers by automating (partially or wholly) the submission process. In additional, the content submission manager 130 can maintain consistency of content by centrally managing the different submissions to different third-party marketplaces 155. For example, if the content submission manager 130 receives a new version of an application, it can propagate the version to other marketplaces without requiring further action form the application developer. In some embodiments, the content submission manager 130 may e-sign the content files with the user's security certificate on behalf of the user and with the use's permission to verify that the files came from the user.

In some embodiments, the content submission manager includes a content submission module, monitoring and reporting module, and billing module. The content submission module can receive or transmit content submissions in various ways. For example, a submission can be received directly from a user (e.g., via an interactive console, web service, or other GUI provided by the content submission system) or from a program that interacts with the content submission manager 130 via an Application Programming Interface (e.g., an API that uses Web services), and so forth. The content submission module may provide a web-based or other interface through which the content creator/submitter can specify the content marketplaces to which a given content item is to be submitted. In some embodiments, the content submission module includes a submission interface (e.g., network interface card, API, subroutine, transmitter, receiver, or the like) configured to communicate with one or more content marketplaces 140, 155.

The monitoring and reporting module monitors and tracks content submissions and reports information and statistics to the user. For example, the monitoring and reporting module 212 may track submission histories, versioning data for submitted content, the status of the submission, the progress of updating the content, or which marketplaces the content has been propagated to. In some such embodiments, the monitoring and reporting module 212 may provide interactive feedback to the user including, for example, current status, time till completion, etc. In some embodiments, the monitoring and reporting module 212 can generate a report detailing or summarizing the submission statistics and data and communicate the report to the user via electronic mail or provide access to the report, usage statistics, or interactive feedback via Web services.

Some content submission services may be fee-based such that the service executes content submissions on behalf of a user in exchange for payment of one or more fees by that user. In some fee-based services, the content submission manager 130 may optionally include the billing module. For example, in some embodiments, fees may be charged to a user based at least partly on an amount of storage, an amount of network resources, a priority level for the request, number of marketplaces for publishing, enhancements to the content, or other criteria. In some embodiments, fees may be charged on the basis of a variety of use factors, such as a price per use of the service, a price per unit of time that computing services are used, a price per storage used, a price per data transferred in and/or out, etc. In at least some embodiments, a content submission system may offer one or more of various tiers, types and/or levels of services or functionality for content submissions. For example, different tiers may receive different levels of content enhancement. The billing module can monitor and track usage of the computer resources, calculate fees due for the usage, or bill the user. The user may be charged a fixed fee payment (e.g., upfront or periodically billed) or other use fees (e.g., variable fees associated with use of various resources, such as electricity, physical rack space, network utilization, etc.).

Figure 2:
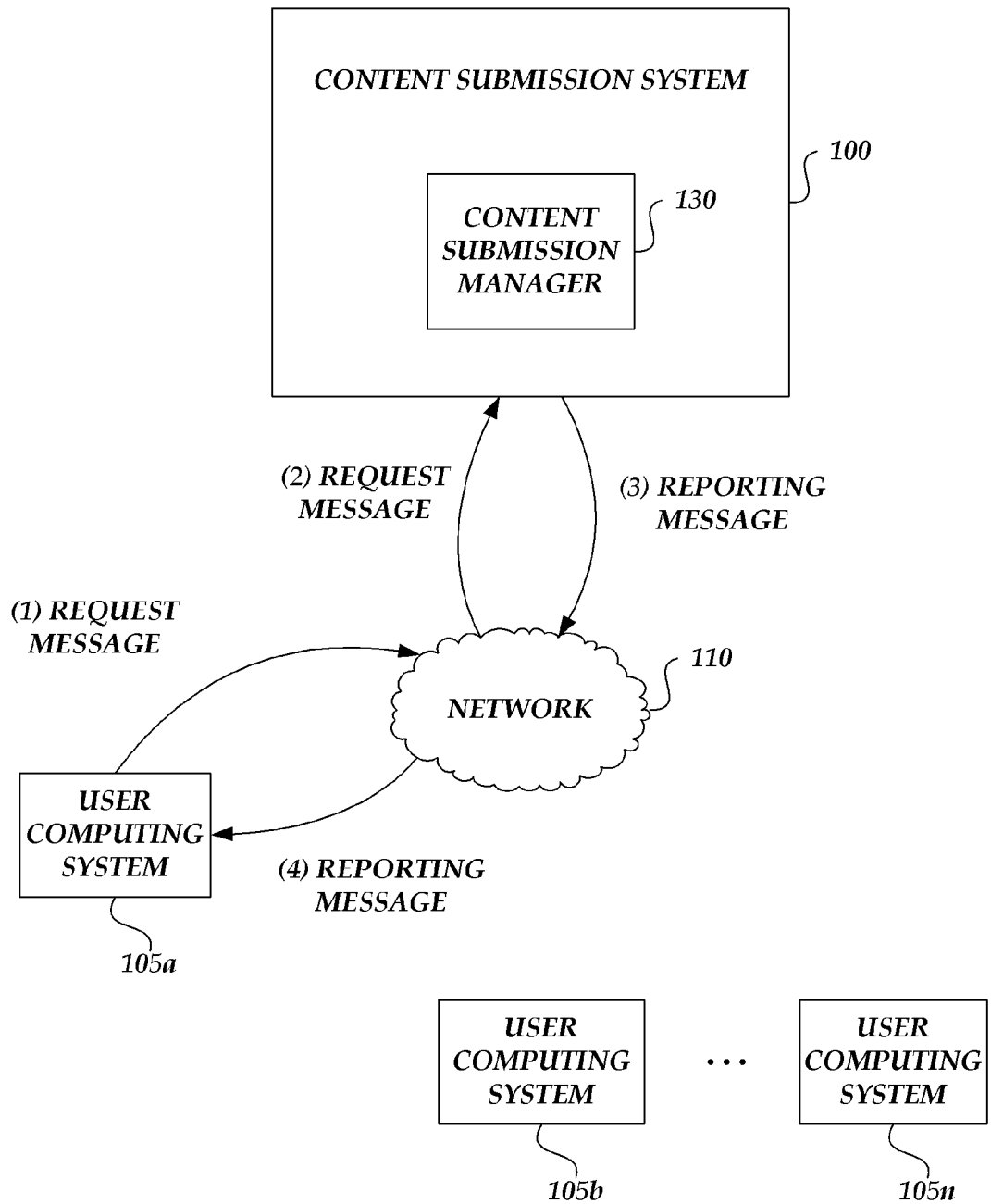
FIG. 2 is a network diagram schematically illustrating an example interaction between a user computing system and a content submission manager of a content submission system.

FIG. 2 is a network diagram schematically illustrating an example interaction between a user computing system 105a and a content submission manager 130 of a content submission system. The content submission system can provide content submission or publication services to multiple user computing systems 105a, 105b, . . . , 105n. In this illustrative example, the content submission system provides an API for the user computing systems 105a, 105b, . . . , 105n to programmatically interact with the content submission manager 130. FIG. 2 illustratively shows the user computing system 105a communicating a content submission request using a request API. The request may be communicated using one or more request messages using the request API that (1) are communicated via the network 110 and (2) are received by the content submission manager 130 of the content submission system. The request message(s) can include information about the user's content. The request message(s) may be sent at different times or may be sent when the information is needed or requested by the content submission system. The request message(s) can include other information about the request such as, e.g., preferences, requirements, and/or restrictions related to the user's content submission.

In some embodiments, the request includes a copy of the content bundle 115 and content metadata 120. In some embodiments, the request may include pointers, links or locations to one or more electronic files, rather than the actual files. The reporting message may also include one or more access credentials (e.g., keys, tokens, user names, passwords, etc.) that are associated with the user's request. The access credentials may be for the content submission system or for third-party marketplace 155 (e.g., for submitting content to the other marketplaces). For example, the access credentials for multiple content marketplaces may be stored by the content submission system 100 and used by the system to access and/or submit content to respective content marketplaces.

In the example shown in FIG. 2, the content submission manager 130 communicates a reporting message using a reporting API (3) via the network 110 which is (4) received by the user computing system 105a. The reporting message can include information related to the results of the content submission or whether the content submission system can grant the request (in whole or in part). The reporting message may also include one or more request identifiers (e.g., keys, tokens, user names, passwords, etc.) that are associated with the user's request. The reporting message can include other information such as, for example, one or more reports including results from the testing.

Other types of programmatic interactions (additionally or alternatively) between the content submission system and the user computing systems are possible in addition to those described above. For example, a request can be received directly from a user (e.g., via an interactive console or other GUI provided by the content submission system) or from an executing program on a user computing system 105. In some embodiments, users may interact with the content submission manager 130 using other types of interfaces and in other ways. For example, the content submission manager 130 may provide a web services interface (e.g., a web page) that allows a user to submit a request using a web browser. Other types of interfaces may also be used.

Figure 3:
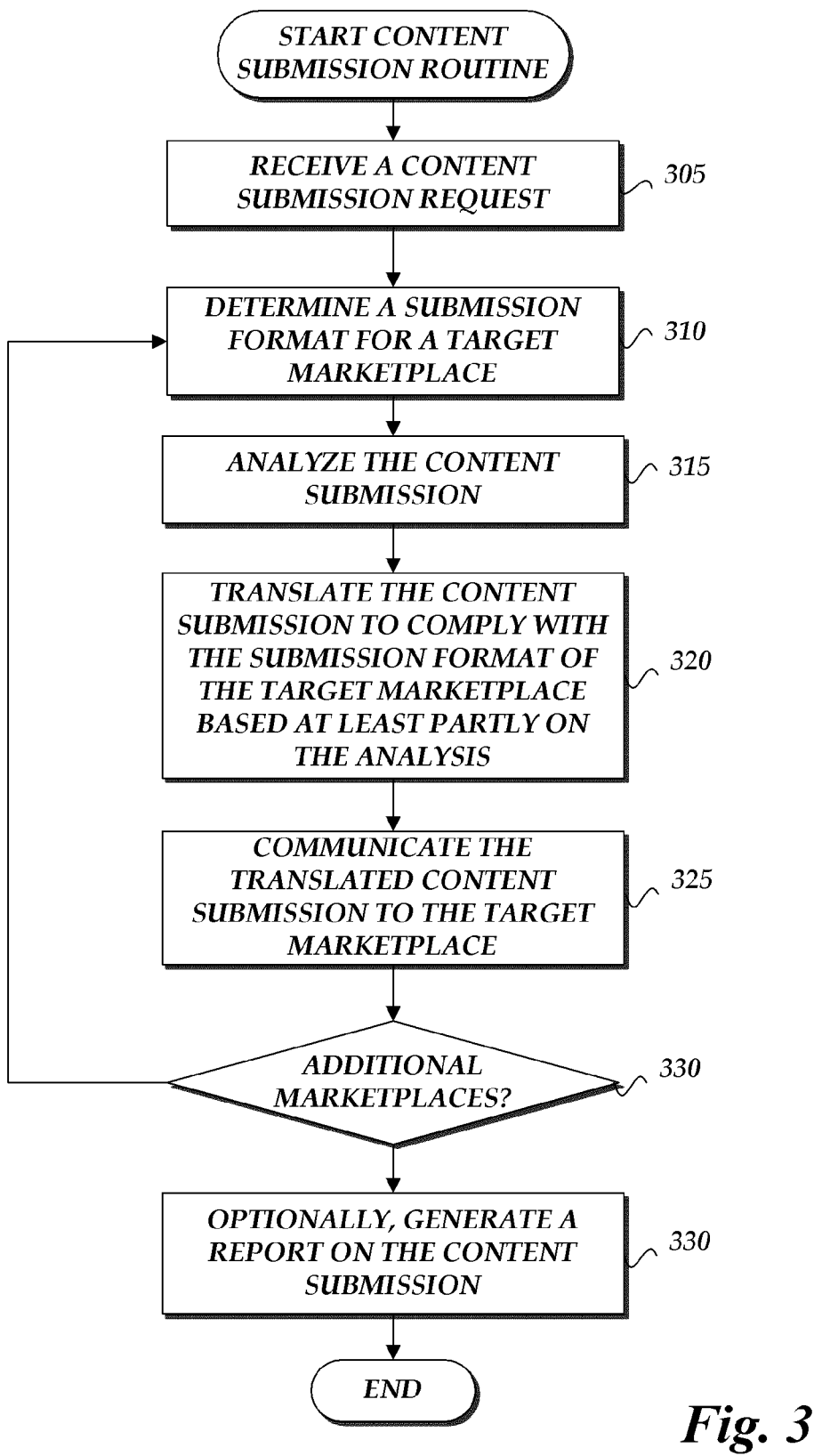
FIG. 3 is a flow diagram that schematically illustrates an example embodiment of a content submission manager routine.

FIG. 3 is a flow diagram that schematically illustrates an example embodiment of a content submission manager routine. In some implementations, the routine can be provided by embodiments of the content submission manager 130 of the content submission system 100. In some implementations, the routine may be performed by other components of the content submission system or other suitable computing system. The example routine is intended to illustrate, but not to limit, various aspects of the content submission manager 130.

With reference to FIG. 3, at block 305, a content submission bundle or request is received by the content submission manager 130 from the user. The content submission may be associated with a content bundle 115 and content metadata 120. The content bundle 115 or content metadata 120 may be included in the content submission request or may be indicated in the request (e.g., by providing a file location). The submission bundle or request may include other types of preferences, requirements, restrictions, or content data.

At block 310, the content submission manager 130 determines a first submission format for a target marketplace. The first submission format describes the requirements or requested format of content submissions by the marketplace. The marketplace may be the content submission system associated with the content submission manager 130 or may be a third party marketplace. For example, the target marketplace may comprise the content marketplace 140 of FIG. 1. As discussed above, the content submission manager 130 may determine the first submission format in a variety of ways, such as, for example, by accessing format data, analyzing a submission interface of the marketplace, or communicating with an API of the marketplace.

At block 315, the content submission manager 130 analyzes the content submission from the user. The content submission manager 130 may uncompress the content bundle 115, if needed. It can then analyze the content submission to determine the contents of the file. As described above, the content submission manager 130 may examine the file names, the content metadata, the files themselves, metadata about the files, or other data related to the content.

At block 320, the content submission manager 130 translates the content submission bundle to comply with the first submission format of the target marketplace based at least partly on the analysis. The content submission manager 130 can use information about the content submission determined from the analysis to identify differences between the content submission and the first submission format. Based at least partly on these differences, the content submission manager 130 can determine how to modify the content submission to comply with the first submission format or generate a new, content submission compliant with the first submission format. For example, the content submission manager 130 may rename, reformat, or reorder the files as needed or requested by the content marketplace. The content submission manager 130 may also determine when to submit particular content metadata to the target marketplace based on its analysis. The content submission manager 130 can submit portions of the content metadata as required or requested by the target marketplace. For example, the content submission manager 130 can determine that the price of the content is an entry requested at a particular screen of the submission interface of the target marketplace and can then obtain the price from the metadata and submit the price in response to that particular screen.

At block 325, the content submission manager 130 communicates the translated content submission to the target marketplace. Portions of the content submission may be communicated at different times. For example, a first file may be sent in response to a first prompt and a second file sent later in response to a second prompt. In some situations, only some of the content submission received from the user is passed on to the target marketplace while in other situations, the entire content submission may be sent. In some embodiments, enhanced content may be added to the content submission or substituted with portions of the content submission (e.g., content metadata 120 or content bundle 115). For example, descriptive text may be added to the content metadata 120 or image files, such as screen shots of the application, may be added to the content bundle 115.

At block 330, the content submission manager 130 optionally determines whether the user desires that the content submission be submitted to additional marketplaces. For example, the request received by the content submission manager 130 at block 305 may have indicated a list of marketplaces for submission. In another example, the content submission manager 130 may examine an account associated with the user to determine whether additional marketplace submissions are desired by the user or to determine which additional marketplaces to submit the content to.

In one embodiment, the content submission is submitted to only the content marketplace 140 and the optional determination at block 330 is not made. In one embodiment, the content submission may be submitted to one or more additional third party marketplaces 155. If the content submission is to be submitted to additional marketplaces, the process proceeds back to block 310 to determine a second submission format (or third, or fourth, etc.) for another target marketplace. If no further marketplaces are targeted for submission, the process proceeds to block 330.

At block 330, the content submission manager 130 generates one or more reports comprising results of the content submission, as described above in FIG. 2. For example, the reports may include submission histories, versioning data for submitted content, the status of the submission, the progress of updating the content, or which marketplaces the content has been propagated to. After block 330, the process ends.

In some embodiments, the content submission manager 130 of FIG. 1 is executed or embodied by one or more computing systems. For example, in some embodiments, a server computing system that has components including a CPU, I/O components, storage, and memory may be used to execute the content submission manager 130. The I/O components include a display, a network connection to the network 150, a computer-readable media drive, and other I/O devices (e.g., a keyboard, a mouse, speakers, etc.). An embodiment of the content submission manager 130 can be stored as one or more executable program modules in the memory of the server and/or on other types of non-transitory computer-readable storage media. In some embodiments, the content submission manager 130 may be configured differently than described above. For example, various functionalities provided by the modules can be combined, rearranged, added, or deleted. In some embodiments, additional or different processors or modules may perform some or all of the functionalities described above. The content submission system 100, including the components 130, 135, 140 shown in FIG. 1, may be implemented by a computing system that comprises one or more physical computers or computing devices, including devices that are remote from each other. The computing system may be programmed via executable code modules to perform the various functions described herein. Many implementation variations are possible.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for managing content submissions, the system comprising:
   a submission interface configured to communicate with a first content marketplace configured to use a first submission format for content submissions, the first submission format identifying expected files and expected information by the content marketplace; and
   a content submission manager comprising one or more computing devices, the content submission manager in communication with the content marketplace, the content submission manager configured to:
      obtain a content submission comprising content metadata and content data associated with a mobile device application, the content metadata at least partly describing the content data, the content submission submitted by a content creator of an electronic content item for distribution in the content marketplace;
      analyze the content submission, including the content metadata, to determine differences between the content submission and the first submission format;
      generate a modified content submission based on the analysis of the content submission, wherein generating the modified content submission comprises (1) translating at least a portion of the content submission into a format that complies with the first submission format of the content marketplace, the translation based at least partly on the determined differences between the content submission and the first submission format, and (2) augmenting the content submission with screenshots of the mobile device application, wherein the content submission manager is configured to run the mobile device application and generate the screenshots; and
      communicate the modified content submission to the content marketplace.

2. The system of claim 1, wherein the content submission manager is configured to obtain a content submission by:
   receiving an external network location of the content data; and
   accessing the external network location and downloading the content data.

3. The system of claim 1, wherein the content submission manager is configured to:
   determine a second submission format of a third party marketplace;
   analyze the content submission to determine differences between the content submission and the second submission format;

translate the content submission to comply with the second submission format of the third party marketplace, the translation of the content submission based at least partly on the determined differences between the content submission and the submission format; and communicate the translated content submission to the third-party marketplace.

4. A system for managing content submissions, the system comprising:

a content submission manager comprising one or more computing devices, the content submission manager in communication with a target marketplace, the content submission manager configured to:

obtain a content submission comprising digital content of an application;

determine a first submission format of the target marketplace based at least partly on information obtained from the target marketplace;

analyze the content submission to determine differences between the content submission and the first submission format;

generate a modified content submission by at least (1) translating content of the content submission to comply with the first submission format of the target marketplace, the translation based at least partly on the analysis of the content submission, and (2) add at least one screenshot of the application to the content submission, wherein the content submission manager is configured to run the application and generate said screenshot; and communicate the modified content submission to the target marketplace.

5. The system of claim 4, wherein the target marketplace is a third-party marketplace.

6. The system of claim 4, wherein the content submission manager is configured to obtain the content submission by:

receiving an external network location of content data associated with the content submission; and accessing the external network location and downloading the content data.

7. The system of claim 4, wherein the content submission manager is configured to obtain the content submission by receiving the content submission from a user computing system associated with a content creator.

8. The system of claim 4, wherein the first submission format comprises a naming convention for submitted files.

9. The system of claim 4, wherein the translation of the content submission comprises at least one of renaming content files and applying digital rights management encryption.

10. The system of claim 4, wherein the first submission format identifies an order of submission for submitted files and wherein the translation of the content comprises reordering content files to comply with the order of submission.

11. The system of claim 4, wherein the content submission manager is configured to determine the first submission format by analyzing a submission interface of the target marketplace.

12. The system of claim 4, wherein the content submission comprises content data and content metadata, the content metadata comprising at least one of content description and content price.

13. A computer-implemented method for managing content submissions, the method comprising:

by a computing system that operates as an intermediary between content creators and content marketplaces:

obtaining a content submission comprising electronic content, said content submission submitted to the computing system by a content creator for submission to a plurality of content marketplaces;

determining submission formats utilized by the plurality of content marketplaces, the submission formats determined based at least partly on information obtained from the content marketplaces, each marketplace comprising a respective interactive system that hosts an electronic catalog of content items that are available for downloading, said submission formats including a first submission format of a first content marketplace and a second submission format of a second content marketplace, said first and second submission formats being different from each other;

analyzing the content submission to determine differences between the content submission and submission formats of the respective content marketplaces;

generating marketplace-specific content submissions for the respective content marketplaces based at least partly on the analysis of the content submission, the marketplace-specific content submissions configured to comply with the submission formats of the respective content marketplaces, wherein generating the marketplace-specific content submissions comprises generating a first market-place-specific content submission that complies with the first submission format and a second marketplace-specific content submission that complies with the second content submission format, said first and second marketplace-specific content submissions comprising different respective sets of files, wherein generating the marketplace-specific content submissions further comprises generating screenshots of an application corresponding to the content submission, and incorporating the screenshots into the marketplace-specific content submissions; and communicating the marketplace-specific content submissions to the respective content marketplaces on behalf of the content creator.

14. The computer-implemented method of claim 13, wherein said obtaining a content submission comprises:

receiving an external network location for content data; and accessing the external network location and downloading the content data.

15. The computer-implemented method of claim 13, wherein the content submission comprises content metadata and content data comprising one or more content files.

16. The computer-implemented method of claim 15, wherein said analyzing the content submission comprises identifying the content files of the content submission that are expected by respective content marketplaces based at least partly on the content metadata.

17. The computer-implemented method of claim 15, wherein said analyzing the content submission comprises identifying the content files of the content submission that are expected by respective content marketplaces based at least partly on a naming convention utilized by the content files.

18. The computer-implemented method of claim 13, further comprising generating additional content that describes a software application included in the content submission, and transmitting the additional content to the plurality of content marketplaces.

19. The computer-implemented method of claim 13, wherein said determining of submission formats comprises communicating through an application programming interface with at least one of the plurality of target marketplaces.

20. The computer-implemented method of claim 13, wherein the content submissions are transmitted as data streams.

\* \* \* \* \*